Aug. 7, 1934.　　　N. R. KRAUSE　　　1,969,016
CORN PICKER-SHELLER
Filed Aug. 5, 1933　　　2 Sheets-Sheet 1
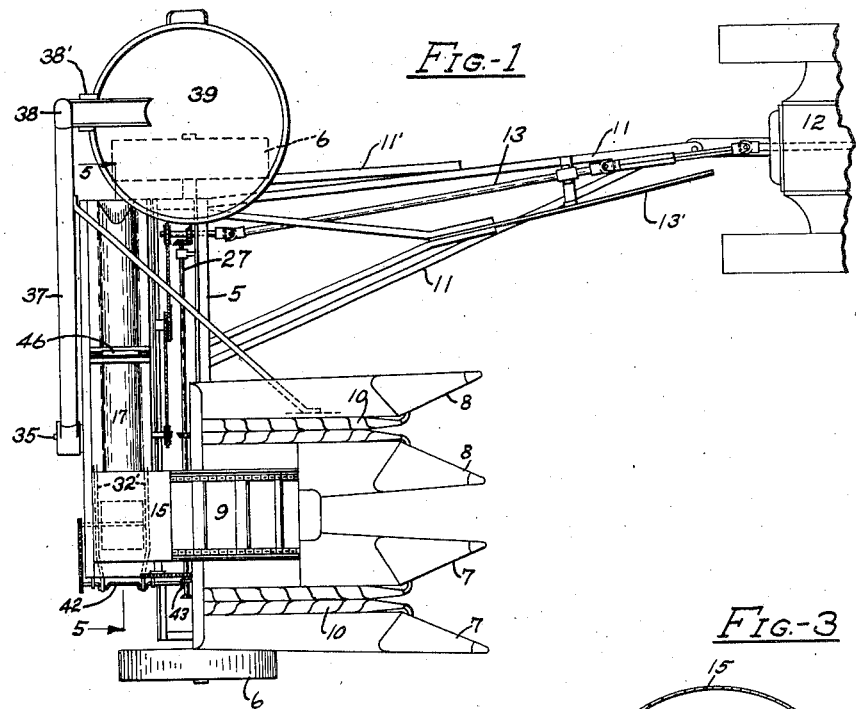
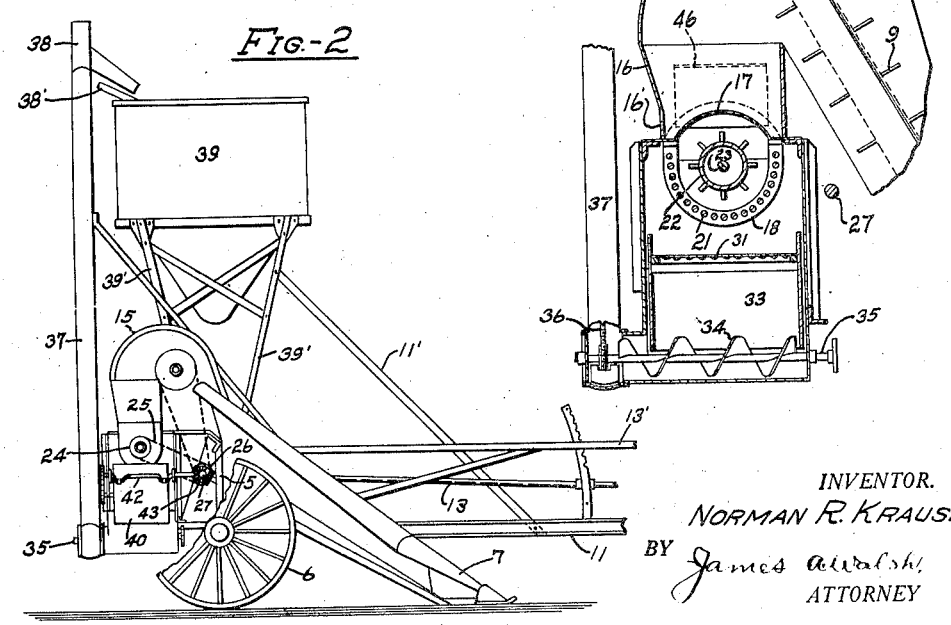
INVENTOR.
NORMAN R. KRAUSE
BY James A. Walsh
ATTORNEY

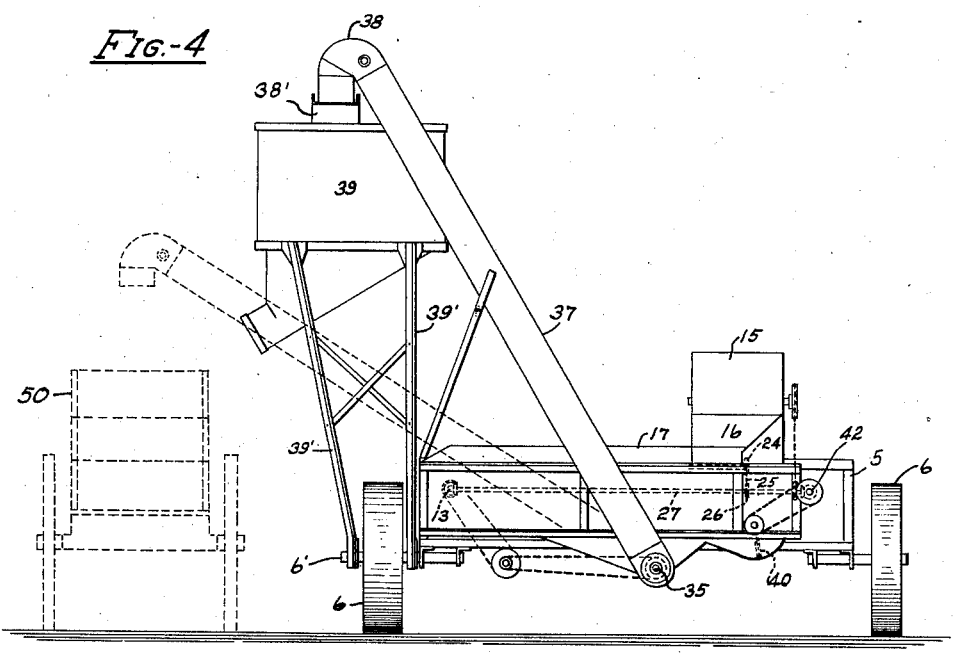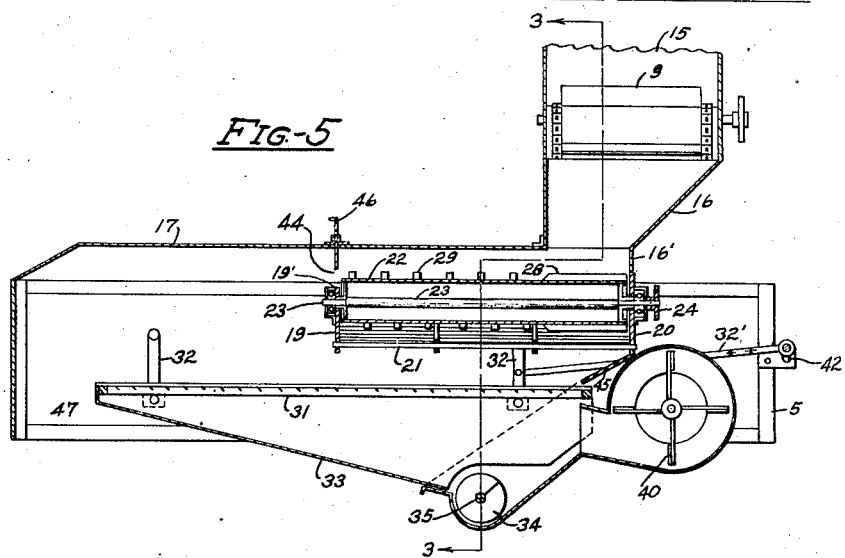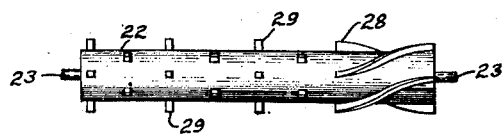

Patented Aug. 7, 1934

1,969,016

UNITED STATES PATENT OFFICE

1,969,016

CORN PICKER-SHELLER

Norman R. Krause, Racine, Wis., assignor to J. I. Case Company, Racine, Wis., a corporation Application August 5, 1933, Serial No. 683,791

6 Claims. (Cl. 56—18)

The object of my invention is to provide a corn picker-sheller by which, when standing corn has matured sufficiently so that it may be shelled while harvesting the crop, I am enabled to both pick the ears from the stalks and shell the same at one operation during the progress of the machine through the field, thus being in position to immediately supply the market demands for shelled corn, and eliminating the labor and expense of transporting the picked ears from the field to storage places to be later shelled and shipped as is customary.

In the accompanying drawings, forming part hereof, Figure 1 is a plan view of a corn picker of the type referred to including my improvement; Fig. 2, a side elevation; Fig. 3, a detail section taken on the line 3—3 in Fig. 5; Fig. 4, a rear elevation of the machine; Fig. 5, a detail section taken on the dotted line 5—5 in Fig. 1; and Fig. 6 is a plan view of the shelling cylinder which I may employ.

In said drawings the numeral 5 indicates the frame of the machine supported by wheels 6, upon which frame gathering points 7, 8, are mounted having an elevator 9 therebetween for conveying gathered material from the rolls 10, a drawbar 11 being secured to the frame and adapted to be attached to a tractor 12 for transporting the machine, and by which tractor the machine parts are actuated through a power shaft 13 in a well known manner; and as said parts are of common and well known construction and arrangement it is deemed unnecessary to specifically describe the same in detail.

The elevator 9 terminates in a hood 15 having an outlet 16 communicating with the inlet 16' of a sheller, the latter in part comprising a casing 17 adapted to be installed on the rear end of the frame 5, as indicated in Figs. 1 and 4. In said casing a cage 18 is mounted comprising end frame members 19, 20, and a series of longitudinally spaced bars 21 arranged in concave formation, Fig. 3, in which cage a rotating shelling cylinder 22 is provided and supported in the frame 19, 20, by a shaft 23 including a sprocket 24 connected by a chain 25 to a source of power, as sprocket 26 mounted upon a shaft 27 driven by the power shaft 13. The cylinder may be of any suitable form, that preferred including a series of propelling blades 28 and a plurality of staggered spikes 29 projecting from the cylinder. Beneath the cylinder 22 is a shoe extending considerably beyond one end of the cylinder and composed of a screen 31 supported by pivotally mounted hangers 32 and having an inclined imperforate floor 33 leading to a transverse auger 34 having a sprocket shaft 35 driven from a suitable source of power, as shown, the opposite end of said auger shaft having an endless elevator 36 connected to and driven thereby, which elevator extends through an adjustable chute 37 having a hood 38 at its upper end adapted to discharge shelled corn into a bin, as 39, carried by the machine, or the chute may be adjusted to deliver into a vehicle, as shown in dotted lines in Fig. 4, or other receptacle. The bin 39, as indicated in Figs. 2 and 4, is mounted on supports 39' pivotally connected to the axle 6' and is fixedly secured to the drawbar 11 by a brace 11', so that as the machine is vertically adjusted by manipulating lever 13', as is common, the bin, being pivotally mounted on the axle and fixedly secured to the drawbar, will not be affected by such adjustments but will remain in constant fixed position independently of the machine, while the chute 37 connected to the machine will rock therewith and for which reason a deflector 38' may be associated with the bin to direct material thereinto as the chute moves slightly in relation to the bin. A blast fan 40 supported on frame 5 and actuated from driving mechanism on the machine or otherwise is positioned to discharge through the shoe to which latter a shaking motion is imparted by the rods 32' connected to crank shaft 42, which latter is driven through gearing 43, Fig. 2.

In operation, as is common, the points 7, 8, and rolls 10, gather and strip the ears from standing corn stalks, which ears are conveyed by the elevator 9 into the hood 15 from whence they discharge onto the rotating cylinder 22, and as the material falls about the blades 28 it is propelled thereby along the cylinder to the spikes 29, which latter remove the kernels from the ears. During the progress of the ears through the cage 18 it will be understood that the end 19 thereof, which terminates at 19', is partially closed, so that crowding of the material against said end causes the shelled cobs and trash to work out through the opening 44 above the shaft 23 and fall to the screen, it being understood that during such operation the shelled kernels and finer trash work through the cage and a portion thereof is guided to the screen by the deflector 45, Fig. 5, the trash remaining on the screen, while the kernels pass therethrough and thence into auger 34 to be conveyed by the elevator 36 to the bin 39 or vehicle as desired. In employing the fixed bin 39 it will be understood that it may have the capacity of a vehicle, as 50, so that the latter need only be loaded periodically instead of continuously, as is common practice, and which method is of advantage in saving the crop as the machine and vehicle are subjected to rough travel through corn fields and material loss of shelled corn occurs when the vehicle is continuously loaded during the irregular movements of both the vehicle and the machine. The movement of the cobs and trash through the outlet 44 is retarded by a damper 46 which may be manually adjusted to control the flow of the material so that a mass thereof may be retained to be thoroughly treated by the cylinder 22 and discharged through the outlet as desired. As the cobs and heavy trash are propelled through the outlet, and the finer trash and kernels forced between the spaced bars 21 and onto the screen 31, the blast from fan 40 discharging longitudinally through the screen sustains the debris thereabove and permits the kernels to pass through the screen to be directed to the auger 34 and thereby delivered to the chute 37 for final discharge, while the cobs and trash are stepped to the opposite end of the screen by the shaking action thereof and discharged through the outlet 47 onto the ground or otherwise disposed of.

I claim as my invention:

1. In a corn picker-sheller, means for gathering and picking ears from stalks, means for removing ears and trash from the gathering and picking means, a receptacle communicating with the removing means for receiving material discharging therefrom, means in the receptacle for shelling corn from the ears thereof, means in the receptacle beneath the shelling means for separating shelled corn from trash and cobs, and means associated with the receptacle for conveying shelled corn therefrom and discharging the same to another receptacle.

2. In a corn picker-sheller, means for gathering and picking ears from stalks, means for removing ears and trash from the gathering and picking means, a receptacle beneath and communicating with the removing means for receiving material discharging therefrom, means in the receptacle for shelling corn from the ears, a shaking shoe in the receptacle having a screen upon which shelled corn and trash from the shelling means are deposited, means associated with the shoe for winnowing shelled corn from trash whereby the corn passes through the screen and into the shoe, and means associated with the shoe for conveying shelled corn therefrom and discharging the same.

3. In a corn picker-sheller, means for gathering and picking ears from stalks, means for removing ears and trash from the gathering and picking means, a receptacle communicating with the removing means for receiving material discharging therefrom, means in the receptacle for shelling corn from the ears, means in the receptacle cooperating with the shelling means for separating shelled corn from cobs and trash, a conveyor in the separating means, and an adjustable chute associated with the conveyor for discharging shelled corn therefrom.

4. In a corn picker-sheller, means for gathering and picking ears from stalks, means for removing the ears and trash from the gathering and picking means, means beneath and communicating with the removing means for shelling the ears, means in the latter means for separating shelled corn from cobs and trash, and means for conveying shelled corn from the separating means 5. In a corn picker-sheller, means for gathering and picking ears from stalks, means for removing the ears and trash from the gathering means, means arranged transversely of and communicating with the removing means for shelling the ears, means in the latter means for separating shelled corn from cobs and trash and discharging the trash, and means for conveying shelled corn from the separating means.

6. In a corn picker-sheller, means for gathering and picking ears from stalks, means for removing ears and trash from the gathering means, means arranged transversely of and communicating with the removing means for shelling the ears, means in the latter means for separating shelled corn from cobs and trash and discharging the trash, means for discharging an air blast longitudinally through said transverse means for winnowing material, and means for conveying shelled corn from the separating means.

NORMAN R. KRAUSE.